US008130745B2

(12) United States Patent
Hua et al.

(10) Patent No.: US 8,130,745 B2
(45) Date of Patent: *Mar. 6, 2012

(54) SYNCHRONIZING CALL FEATURE DATA BETWEEN AN IMS NETWORK AND A LEGACY NETWORK

(75) Inventors: Shiyan Hua, Lisle, IL (US); Michael J. Rudolph, Naperville, IL (US)

(73) Assignee: Alcatel Lucent, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/497,112

(22) Filed: Jul. 2, 2009

(65) Prior Publication Data

US 2009/0268702 A1    Oct. 29, 2009

Related U.S. Application Data

(63) Continuation of application No. 11/566,497, filed on Dec. 4, 2006, now Pat. No. 7,583,655.

(51) Int. Cl.
*H04J 3/24* (2006.01)
*H04W 4/00* (2009.01)
*H04W 40/00* (2009.01)
*H04L 12/66* (2006.01)
*H04M 1/00* (2006.01)
*G06F 15/16* (2006.01)

(52) U.S. Cl. ........ 370/350; 370/338; 370/352; 455/445; 455/432.3; 455/552.1; 709/227

(58) Field of Classification Search .................. 370/338, 370/350, 352
See application file for complete search history.

(56) References Cited

U.S. PATENT DOCUMENTS

| | | | |
|---|---|---|---|
| 2004/0157601 A1* | 8/2004 | Silfverberg et al. | 455/432.3 |
| 2005/0278447 A1* | 12/2005 | Raether et al. | 709/227 |
| 2006/0258394 A1* | 11/2006 | Dhillon et al. | 455/552.1 |
| 2006/0276193 A1* | 12/2006 | Itzkovitz et al. | 455/445 |
| 2006/0286984 A1* | 12/2006 | Bonner | 455/445 |

* cited by examiner

*Primary Examiner* — Dwayne Bost
*Assistant Examiner* — Timothy Pham
(74) *Attorney, Agent, or Firm* — Duft, Bornsen & Fishman, LLP

(57) ABSTRACT

Communication networks and methods are disclosed that synchronize call feature data between an IMS network and a legacy network, such as a cellular network. An IMS subscriber server (e.g., a Home Subscriber Server (HSS)) is notified of changes to feature data for a call feature (e.g., call forwarding, call waiting, etc) in the IMS network. Responsive to the notification, the IMS subscriber server updates a legacy subscriber server (e.g., a Home Location Register (HLR)) in the legacy network based on the change to the feature data. Similarly, the IMS subscriber server identifies changes to feature data for a call feature in the legacy network. Responsive to the change, the IMS subscriber server notifies one or more application servers in the IMS network of the change to the feature data. Through the IMS subscriber server, feature data for call features is synchronized between the IMS network and the legacy network.

20 Claims, 6 Drawing Sheets

SYNCHRONIZING CALL FEATURE DATA BETWEEN AN IMS NETWORK AND A LEGACY NETWORK

RELATED APPLICATIONS

This non-provisional patent application is a continuation of U.S. patent application Ser. No. 11/566,497 filed on Dec. 4, 2006, now U.S. Pat. No. 7,583,655 which is incorporated herein by reference.

BACKGROUND OF THE INVENTION

1. Field of the Invention

The invention is related to the field of communication networks and, in particular, to synchronizing call feature data between an IMS network and a legacy network, such as a cellular network.

2. Statement of the Problem

Wireless phone providers are developing dual mode phones that have the functionality for communicating with a cellular network (e.g., CDMA or GSM) and another type of wireless data network, such as a WiFi network (e.g., 802.11b, 802.11g, etc). The concept of the dual mode phone is to allow a user the flexibility to communicate with either the cellular network or the wireless data network. The wireless data networks are typically used for data communications such as Internet browsing, email, etc, but may also be used for voice communications in the form of VoIP calls. Cellular networks are typically used for voice communications, but have also been adapted for data communications.

When a dual mode phone is in range of the cellular network, the dual mode phone registers with the cellular network to receive communication access. The user may subscribe to call features offered by the cellular service provider, such as call forwarding, call waiting, caller ID, etc. The call features subscribed to by the user are typically recorded in a user profile that is stored in a Home Location Register (HLR) in the cellular network. Some of these call features may be changed or updated by the user through his/her dual mode phone, through a web page, etc. For example, the user may change a call forwarding directory number to allow calls to the dual mode phone to be routed to an office phone. When the user changes a call feature, the cellular network updates the user profile in the HLR to reflect the change.

In addition to cellular networks, dual mode phones may come into range of local wireless "hot spots" in a corporation or enterprise, airports, book stores, coffee shops, etc. The wireless hot spot may be in a building where cellular service is unavailable or may overlap a cellular service area. When a dual mode phone is in range of a wireless hot spot, the dual mode phone registers with an IP Multimedia Subsystem (IMS) core network via the Wireless LAN (WLAN) to receive communication access. The IP Multimedia Subsystem (IMS) core network can provide call features similar to the call features offered by the cellular network.

An IMS network includes a Home Subscriber Server (HSS) that is a master database that stores user profiles, performs authentication and authorization of the user, and provides information about the physical location of the user. Call features, such as call forwarding, call waiting, caller ID, etc, are provided in the IMS network by application servers (AS). Again, some of these call features provided by the application servers may be changed or updated by the user through his/her dual mode phone, through a web page, etc, and the change to the call feature is stored in the appropriate application server. For instance, if a user changes call forwarding busy digits, then the application server providing the call forwarding busy feature stores these digits for the user.

The application servers communicate with the HSS over the Diameter Sh interface to extract the necessary feature data to dispatch the logic of a call feature. The Diameter Sh interface defines two types of data: transparent and non-transparent. Transparent data is data that an application server may define and transmit to the HSS for storage. The HSS does not normally interpret or otherwise process the transparent data but blindly stores the data in a repository until the application server retrieves the data. Non-transparent data is data that is explicitly defined as readable, but cannot be changed by application server. It may have an HSS role defined for other HSS interfaces (registration or provisioning) and therefore the HSS has knowledge of the content.

A dual mode phone should provide similar call features regardless of whether access is through the cellular network or the wireless data network (e.g., IMS network). However, a problem may occur if the user changes one or more of the call features. If access of the dual mode phone is through the cellular network, then the call feature change will be made in the cellular network and stored in the HLR. If access of the dual mode phone is through the IMS network, then the call feature change will be made in the IMS network and stored in the application server that is providing the call feature and/or the HSS.

Unfortunately, there is presently no efficient mechanism to synchronize call feature changes between the cellular network (or other legacy networks) and an IMS network. Presently, an application server may query an HLR for data updates, but the interface (typically MAP) between the application server and the HLR is insufficient to provide the notifications required to synchronize the call feature changes. As a consequence, an application server in the IMS network that is adapted to provide a call feature to a user may not be notified of a change to the call feature in the cellular network. Similarly, the HLR in the cellular network may not be notified of a change to the call feature in the IMS network. A user of a dual mode phone may unfortunately not receive consistent call features from the cellular network and the IMS network.

SUMMARY OF THE SOLUTION

The invention solves the above and other related problems by using an IMS subscriber server, such as a Home Subscriber Server (HSS) that is integrated with a legacy subscriber server (HLR), to assist in synchronizing call feature data between an IMS network and a legacy network (e.g., a cellular network). One embodiment illustrates the situation where a user of a dual mode device changes feature data for an IMS call feature in the IMS network. An application server, which provides the IMS call feature, receives a change to the feature data for the IMS call feature from the user of the dual mode device. One example of a change to feature data may be to change a call forwarding directory number for a call forwarding feature in the IMS network. The application server then notifies the IMS subscriber server (e.g., an HSS) of the change to the feature data for the IMS call feature. The IMS subscriber server receives the notification of the feature data change from the application server, and updates feature data for a legacy call feature in a legacy subscriber server based on the change to the feature data for the IMS call feature. The legacy subscriber server is the network node that stores feature data for legacy call features provided in the legacy network. By updating the legacy subscriber server based on the change to the feature data in the IMS network, the feature data for the legacy call feature will be synchronized with the feature data for the IMS call feature. If the user of the dual mode device subsequently receives communication access through the legacy network, then the legacy network can advantageously provide the call feature to the user in the same manner as the IMS network.

Another embodiment illustrates the situation where a user of a dual mode device changes feature data for a legacy call feature in the legacy network. The legacy subscriber server receives a change to the feature data for the legacy call feature. As the legacy subscriber server is integrated with the IMS subscriber server, the IMS subscriber server then identifies the change to the feature data for the legacy call feature in the legacy subscriber server. Responsive to identifying the change, the IMS subscriber server notifies one or more application servers in the IMS network of the change to the feature data for the legacy call feature. The application servers may then update the feature data for the IMS call feature based on the notification from the IMS subscriber server. By updating one or more of the application servers in the IMS network based on the change to the feature data in the legacy network, the feature data for the IMS call feature will be synchronized with the feature data for the legacy call feature. If the user of dual mode device subsequently receives communication access through the IMS network, then the IMS network can advantageously provide the call feature to the user in the same manner as the legacy network.

The invention may include other exemplary embodiments described below.

DESCRIPTION OF THE DRAWINGS

The same reference number represents the same element or same type of element in the drawings.

DETAILED DESCRIPTION OF THE INVENTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
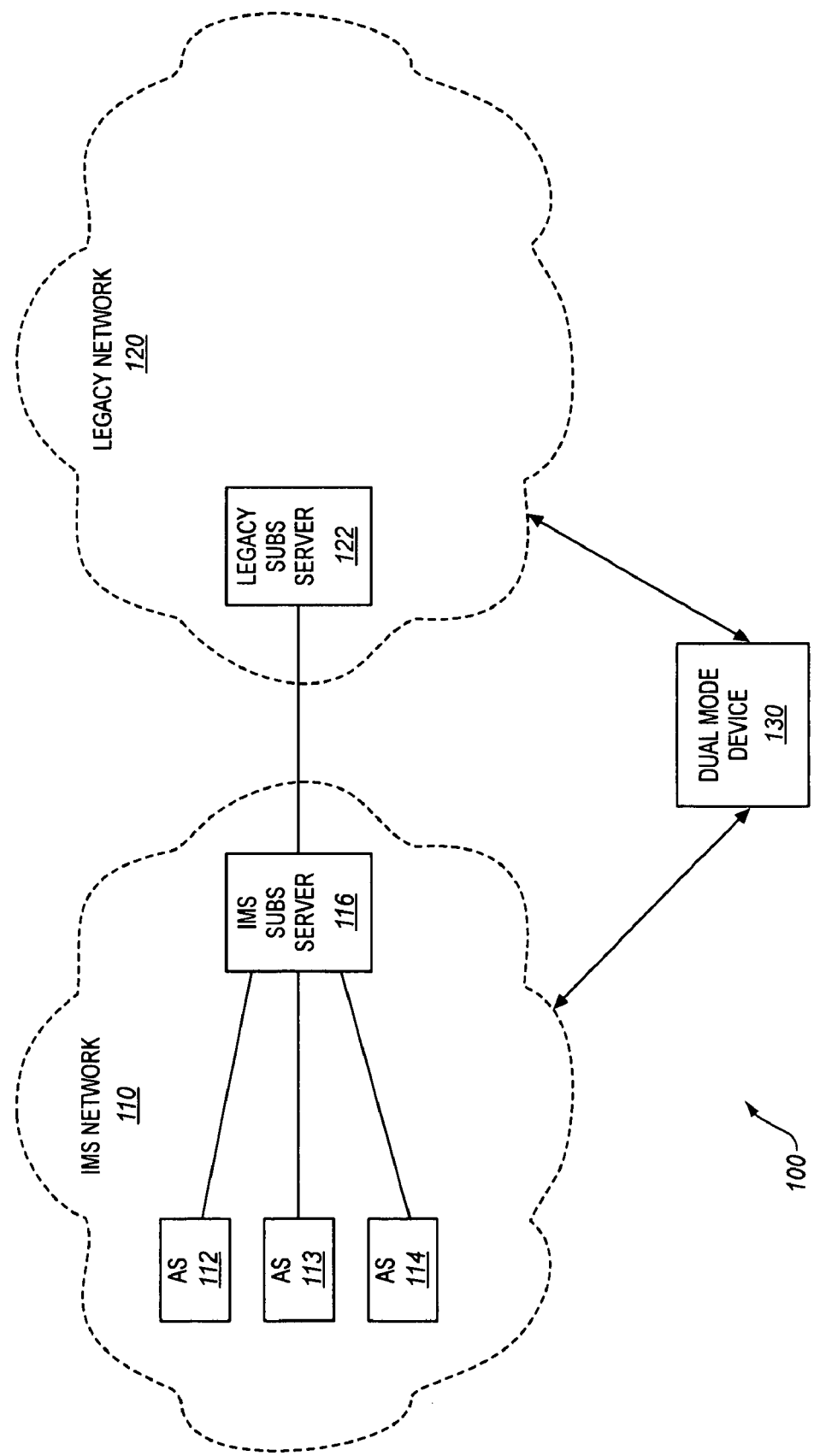
FIG. 1 illustrates a communication network in an exemplary embodiment of the invention.

FIG. 1 illustrates a communication network 100 in an exemplary embodiment of the invention. Communication network 100 includes an IMS network 110 and a legacy network 120. The network clouds illustrating the networks are not being used to show the actual service areas of the networks, as the service areas may be separate or overlap. IMS network 110 and legacy network 120 are separate networks, but both networks 110 and 120 may be managed or owned by a common service provider.

IMS network 110 and legacy network 120 are both adapted to provide communication services to dual mode device 130. Dual mode device 130 comprises any type of communication device adapted to communicate with both an IMS network and a legacy network. Dual mode device 130 may be a wireless device, a wireline device, or a combination of the two. IMS network 110 and legacy network 120 are also adapted to provide call features to dual mode device 130. A call feature comprises some type of special service provided by IMS network 110 and/or legacy network 120. Examples of call features are call forwarding unconditional, call forwarding busy, call forwarding no answer, call forwarding not reachable, call forwarding default, calling number identification presentation, calling number identification restriction, calling name presentation, call waiting, barring on all incoming calls, do not disturb, etc.

A call feature typically has feature data associated with a particular user. For instance, the call forwarding unconditional feature includes feature data such as a directory number for the call forwarding, an activate/deactivate indicator, etc. The feature data is typically user-changeable or user-updateable meaning that the user can change the feature data through his/her dual mode device, through a web page, or through another means. As an example, if the user of dual mode device 130 wants to change a call forwarding directory number, then the user can enter a new call forwarding directory number and an instruction (e.g., a feature code) through dual mode device 130 to change the call forwarding directory number.

IMS network 110 includes one or more application servers 112-114 and an IMS subscriber server 116. Application servers 112-114 are each adapted to provide a call feature to dual mode device 130. In providing a call feature, application servers 112-114 may need to store, access, or otherwise process feature data associated with the call feature. IMS subscriber server 116 comprises any database or server adapted to store information related to calls or sessions in IMS network 110. One example of IMS subscriber server 116 is a Home Subscriber Server (HSS). IMS subscriber server 116 may store a user profile for the user of dual mode device 130, which may include storing feature data for one or more call features subscribed to by the user in IMS network 110. IMS network 110 may include other elements (not shown), such as a call session control function (CSCF) adapted to serve dual mode device 130.

Legacy network 120 comprises any non-IMS mobile network adapted to provide call features. Examples of legacy network 120 include a CDMA network and a GSM network. "Legacy" is not intended to refer to only networks presently existing, but also to non-IMS networks that are developed in the future. Legacy network 120 includes a legacy subscriber server 122, which comprises any database or server adapted to store information related to calls in legacy network 120. One example of legacy subscriber server 122 is a Home Location Register (HLR). Legacy subscriber server 122 may store a user profile for the user of dual mode device 130, which may include storing feature data for one or more call features subscribed to by the user in legacy network 120. Legacy subscriber server 122 and IMS subscriber server 116 may comprise a consolidated or shared subscriber server, such as a combined HLR/HSS. Legacy network 120 may include other elements (not shown), such as a Mobile Switching Center (MSC) or other switching system adapted to serve dual mode device 130.

If dual mode device 130 is in range of IMS network 110, then dual mode device 130 registers with IMS network 110. When dual mode device 130 is registered with IMS network 110, dual mode device 130 receives communication access from IMS network 110 to place or receive calls. One or more of application servers 112-114 may provide a call feature to dual mode device 130 if a call is placed to or from dual mode device 130 over IMS network 110. Application servers 112-114 may also allow the user of dual mode device 130 to change or update feature data associated with a call feature.

Similarly, if dual mode device 130 is in range of legacy network 120, then dual mode device 130 registers with legacy network 120. When dual mode device 130 is registered with legacy network 120, dual mode device 130 receives communication access from legacy network 120 to place or receive calls. Legacy network 120, or more precisely one or more network nodes (not shown) in legacy network 120, may provide a call feature to dual mode device 130 if a call is placed to or from dual mode device 130 over legacy network 120. Legacy network 120 may also allow the user of dual mode device 130 to change or update feature data associated with a call feature.

According to embodiments of the invention described herein, if a change is made to feature data of a call feature in one network (e.g., IMS network 110), then the feature data of the corresponding call feature in the other network (e.g., legacy network 120) is automatically synchronized. By synchronizing the feature data of call features between the networks 110 and 120, the user of dual mode device 130 has the same call feature experience regardless of whether communication access is through IMS network 110 or legacy network 120.

Figure 2:
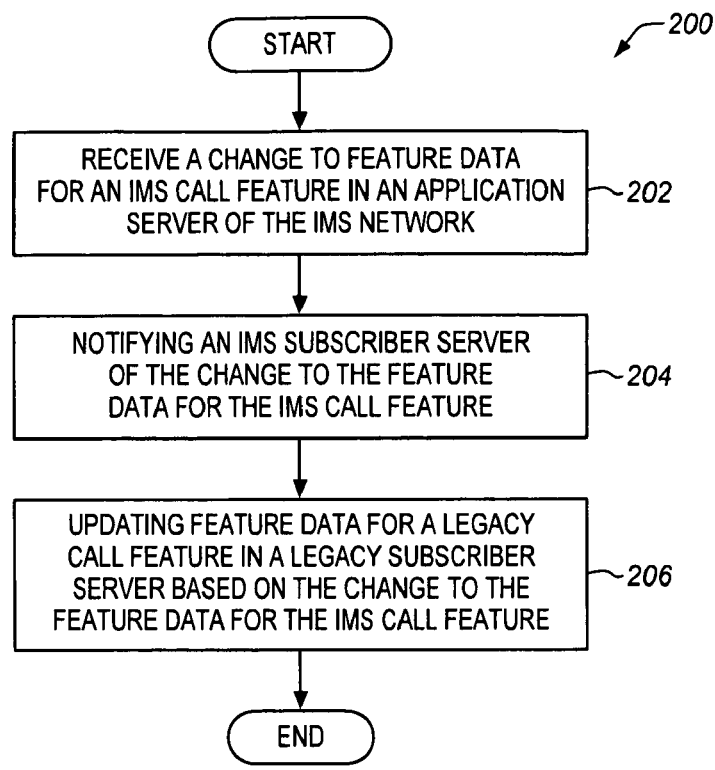
FIG. 2 is a flow chart illustrating a method of synchronizing feature data for a call feature in an exemplary embodiment of the invention.

FIG. 2 is a flow chart illustrating a method 200 of synchronizing feature data for a call feature in an exemplary embodiment of the invention. The steps of method 200 will be described with reference to communication network 100 in FIG. 1. The steps of the flow chart in FIG. 2 are not all inclusive and may include other steps not shown.

For method 200, assume that dual mode device 130 has communication access through IMS network 110 and is changing feature data for a call feature being provided by application server 112 in IMS network 110. In step 202 of method 200, application server 112 receives a change to the feature data for the IMS call feature. As previously stated, the change may be received from dual mode device 130, from a web site, or from some other means. One example of a change to feature data may be a change to the call forwarding directory number for a call forwarding feature in IMS network 110. The term IMS call feature refers to a call feature being provided by IMS network 110.

In step 204, application server 112 notifies IMS subscriber server 116 of the change to the feature data for the IMS call feature. As an example of notification, assume that the IMS subscriber server 116 comprises an HSS. One interface commonly used between an application server and an HSS is the Diameter Sh interface. Application server 112 may thus use functionality defined for the Sh interface to notify IMS subscriber server 116 of the change to the feature data. In one embodiment, application server 112 may format a transparent data block defined for the Sh interface indicating the change to the feature data for the IMS call feature. The change in the feature data indicated in the transparent data block is for a single call feature. Application server 112 may then transmit the transparent data block to IMS subscriber server 116.

IMS subscriber server 116 receives the notification of the feature data change from application server 112. In step 206, IMS subscriber server 116 updates feature data for a legacy call feature in legacy subscriber server 122 based on the change to the feature data for the IMS call feature. The feature data for the legacy call feature corresponds with the feature data for the IMS call feature. For instance, if the change in IMS network 110 is to a call forwarding feature, then the corresponding call forwarding feature in legacy network 120 is updated in legacy subscriber server 122.

As an example of updating legacy subscriber server 122, assume that IMS subscriber server 116 receives the transparent data block from application server 112. IMS subscriber server 116 (e.g., an HSS) interprets or otherwise processes the transparent data block to identify the change to the feature data in IMS network 110. This may include HLR data range and consistency validation with other HLR data. Such functionality is a departure from the functionality of a traditional HSS of an IMS network, as an HSS does not presently interpret transparent data. IMS subscriber server 116 then updates legacy subscriber server 122 (e.g., an HLR) based on the change identified in the transparent data block. For instance, IMS subscriber server 116 may use feature request functionality from CDMA or supplementary service update functionality from UMTS to update legacy subscriber server 122. If an HSS and HLR are integrated, then such message/request is internal to a HSS/HLR integrated server. If an HSS and HLR are separate servers, then such message/requests may be standards-based UMTS MAP messages or ANSI-41 MAP messages. IMS subscriber server 116 may also notify other application servers 113-114 of the change to the feature data.

By updating legacy subscriber server 122 based on the change to the feature data in IMS network 110, the feature data for the legacy call feature will be synchronized with the feature data for the IMS call feature. If the user of dual mode device 130 subsequently receives communication access through legacy network 120, then legacy network 120 can advantageously provide the call feature to the user in the same manner as IMS network 110.

Figure 3:
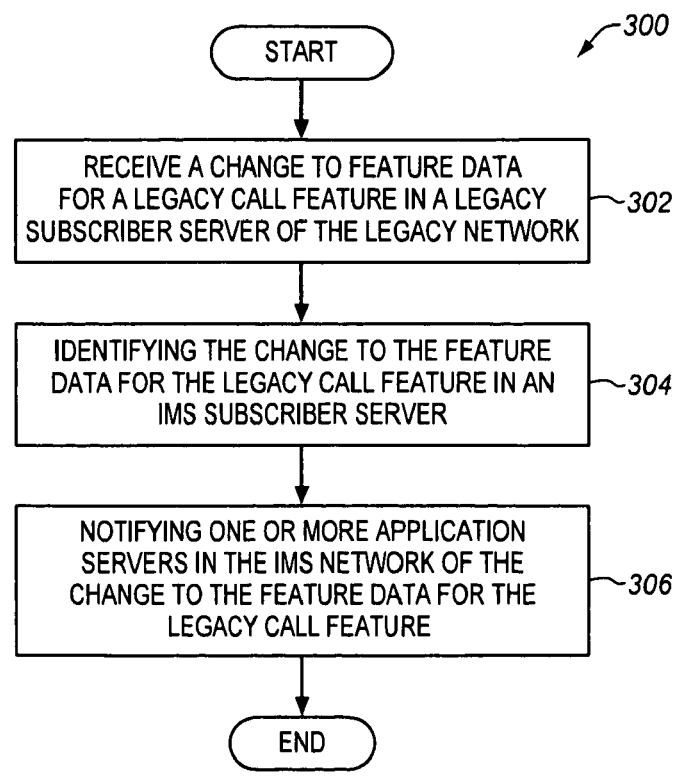
FIG. 3 is a flow chart illustrating another method of synchronizing feature data for a call feature in an exemplary embodiment of the invention.

FIG. 3 is a flow chart illustrating another method 300 of synchronizing feature data for a call feature in an exemplary embodiment of the invention. The steps of method 300 will be described with reference to communication network 100 in FIG. 1. The steps of the flow chart in FIG. 3 are not all inclusive and may include other steps not shown.

For method 300, assume that dual mode device 130 has communication access through legacy network 120 and is changing feature data for a call feature being provided by a network node in legacy network 120. In step 302 of method 300, legacy subscriber server 122 receives a change to the feature data for the legacy call feature. As previously stated, the change may be received from dual mode device 130, from a web site, or from some other means. The term legacy call feature refers to a call feature being provided by legacy network 120.

In step 304, IMS subscriber server 116 identifies the change to the feature data for the legacy call feature in legacy subscriber server 122. IMS subscriber server 116 may include logic or an application that monitors updates in legacy subscriber server 122. Alternatively, legacy subscriber server 122 may include logic or an application that notifies IMS subscriber server 116 when an update occurs in legacy subscriber server 122.

In step 306, IMS subscriber server 116 notifies one or more application servers 112-114 of the change to the feature data for the legacy call feature. As an example of notification, again assume that the IMS subscriber server 116 comprises an HSS. IMS subscriber server 116 may thus use functionality defined for the Sh interface to notify application servers 112-114 of the change to the feature data. In one embodiment, IMS subscriber server 116 may format a transparent data block defined for the Sh interface indicating the change to the feature data for the legacy call feature and possibly feature data for other legacy call features. IMS subscriber server 116 may then transmit the transparent data block to application servers 112-114. Application servers 112-114 may then process the transparent data block to identify the change to the feature data for the legacy call feature, and to update the feature data for the IMS call feature based on the feature data for the legacy call feature. Application servers 112-114 may additionally use the functionality defined for the Sh interface to subscribe to IMS subscriber server 116 to be notified of changes to feature data.

By updating one or more of application servers 112-114 based on the change to the feature data in legacy network 120, the feature data for the IMS call feature will be synchronized with the feature data for the legacy call feature. If the user of dual mode device 130 subsequently receives communication access through IMS network 110, then IMS network 110 can advantageously provide the call feature to the user in the same manner as legacy network 120.

FIGS. 4-7 illustrate examples of synchronizing feature data between an IMS network and a cellular network in exemplary embodiments of the invention.

Figure 4:
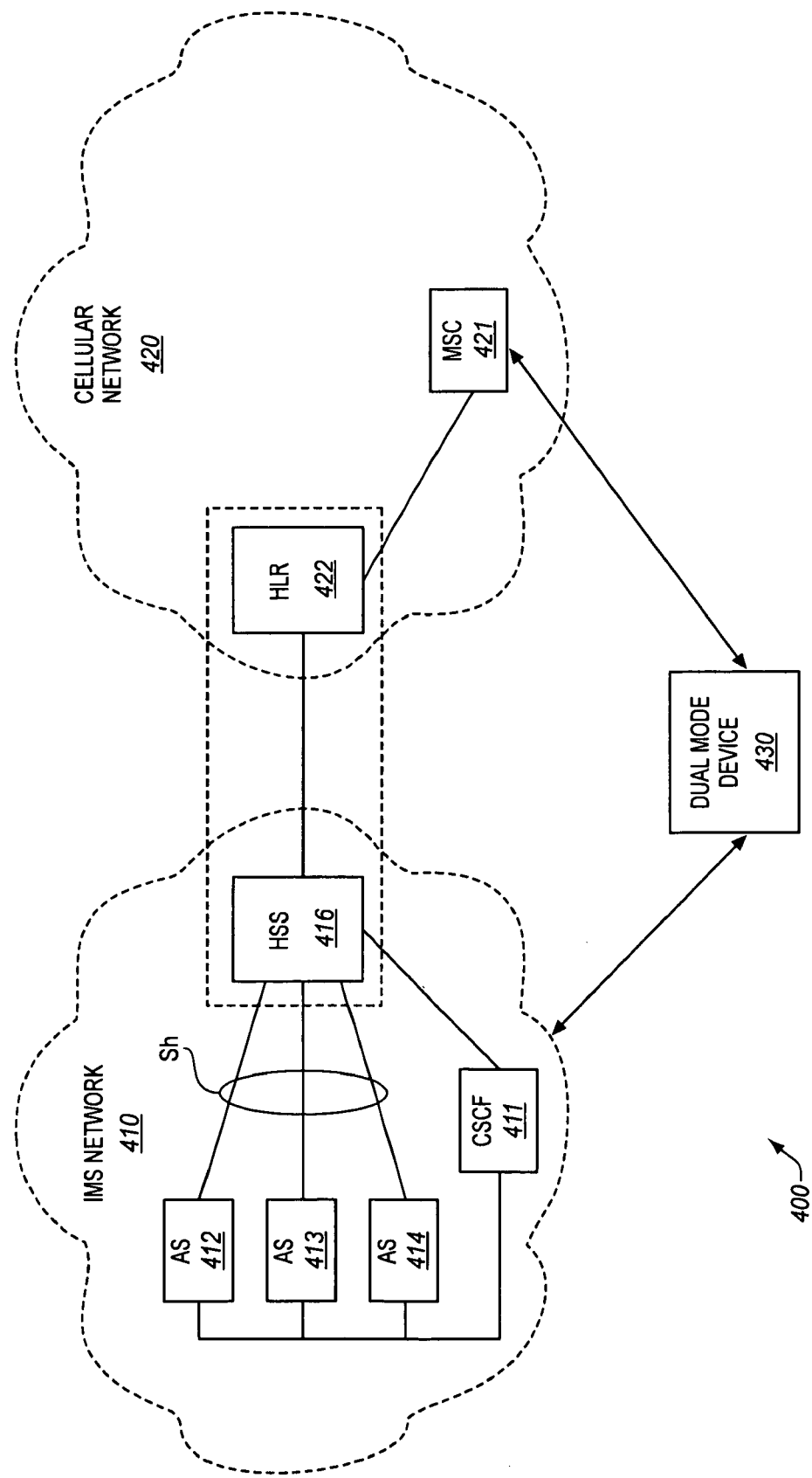
FIG. 4 illustrates another communication network in an exemplary embodiment of the invention.

FIG. 4 illustrates another communication network 400 in an exemplary embodiment of the invention. Communication network 400 includes an IMS network 410 and a cellular network 420. The network clouds illustrating the networks are not being used to show the actual service areas of the networks, as the service areas may be separate or overlap. IMS network 410 includes a CSCF 411, a plurality of application servers 412-414, and an HSS 416. Cellular network 420 includes a Mobile Switching Center (MSC) 421 and an HLR 422. HLRs are known in cellular networks as databases used to store user profiles. Similarly, HSSs are known in IMS networks as databases used to store user profiles. In this embodiment, HLR 422 and HSS 416 are implemented as a consolidated or a combined HLR/HSS. HLR 422 and HSS 416 may be a physically combined unit, or may comprise multiple units that synchronize their data such that they appear to be a single unit.

IMS network 410 and legacy network 420 are both adapted to provide communication services to dual mode device 430. In IMS network 410, CSCF 411 serves dual mode device 430 to provide communication access through IMS network 410. Application servers 412-414 provide call features in IMS network 410 for dual mode device 430, such as call forwarding, call waiting, etc. HSS 416 enables recall of the feature data stored in HLR 422 for the call features provided by IMS network 410 in addition to other call-related or session-related data. In IMS network 410, application servers 412-414 communicate with HSS 416 through a Diameter Sh interface.

In cellular network 420, MSC 421 serves dual mode device 430 to provide communication access through cellular network 420. HLR 422 stores feature data for the call features provided by cellular network 420 in addition to other call-related data.

Figure 5:
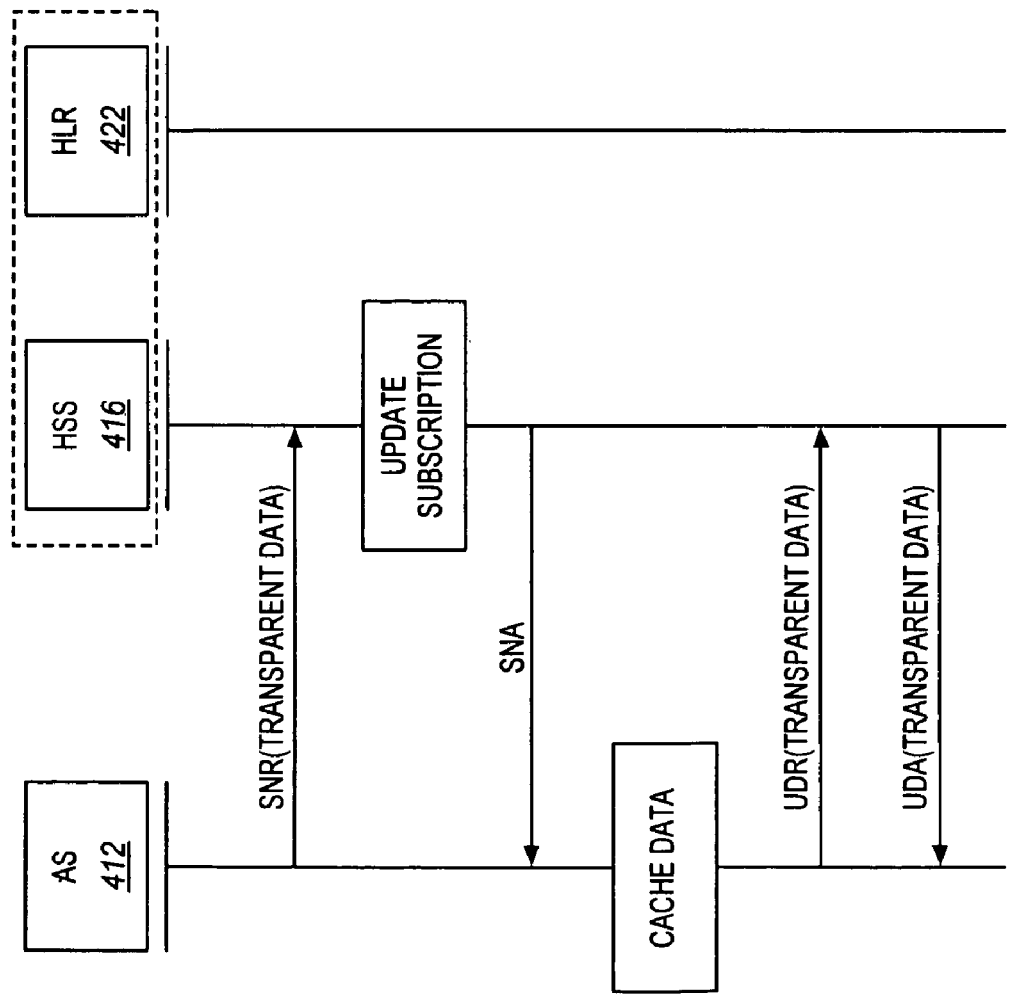
FIG. 5 is a message diagram illustrating how application servers subscribe to feature data changes in an exemplary embodiment of the invention.

Application servers 412-414 in FIG. 4 provide the call features for IMS network 410. In order to synchronize feature data with cellular network 420, application servers 412-414 first subscribe to HSS 416 to receive updates on the feature data. FIG. 5 is a message diagram illustrating how application servers 412-414 subscribe to feature data changes in an exemplary embodiment of the invention.

To start in FIG. 5, application server 412 transmits a Subscribe Notify Request (SNR) message to HSS 416 requesting to be notified of changes to feature data for a particular call feature or call features. HSS 416 then responds to application server 412 with a Subscribe Notify Answer (SNA). Application server 412 then transmits a User Data Request (UDR) to HSS 416 to read feature data and other call-related data into a local cache. Responsive to the UDR, HSS 416 transmits a UDA message to application server 412 that includes the feature data and other call-related data. In this message sequence, the pre-defined transparent data is contained in a User-Data AVP of the UDR. The SNR enables subsequent of PNR notifications when feature elements are changed.

Figure 6:
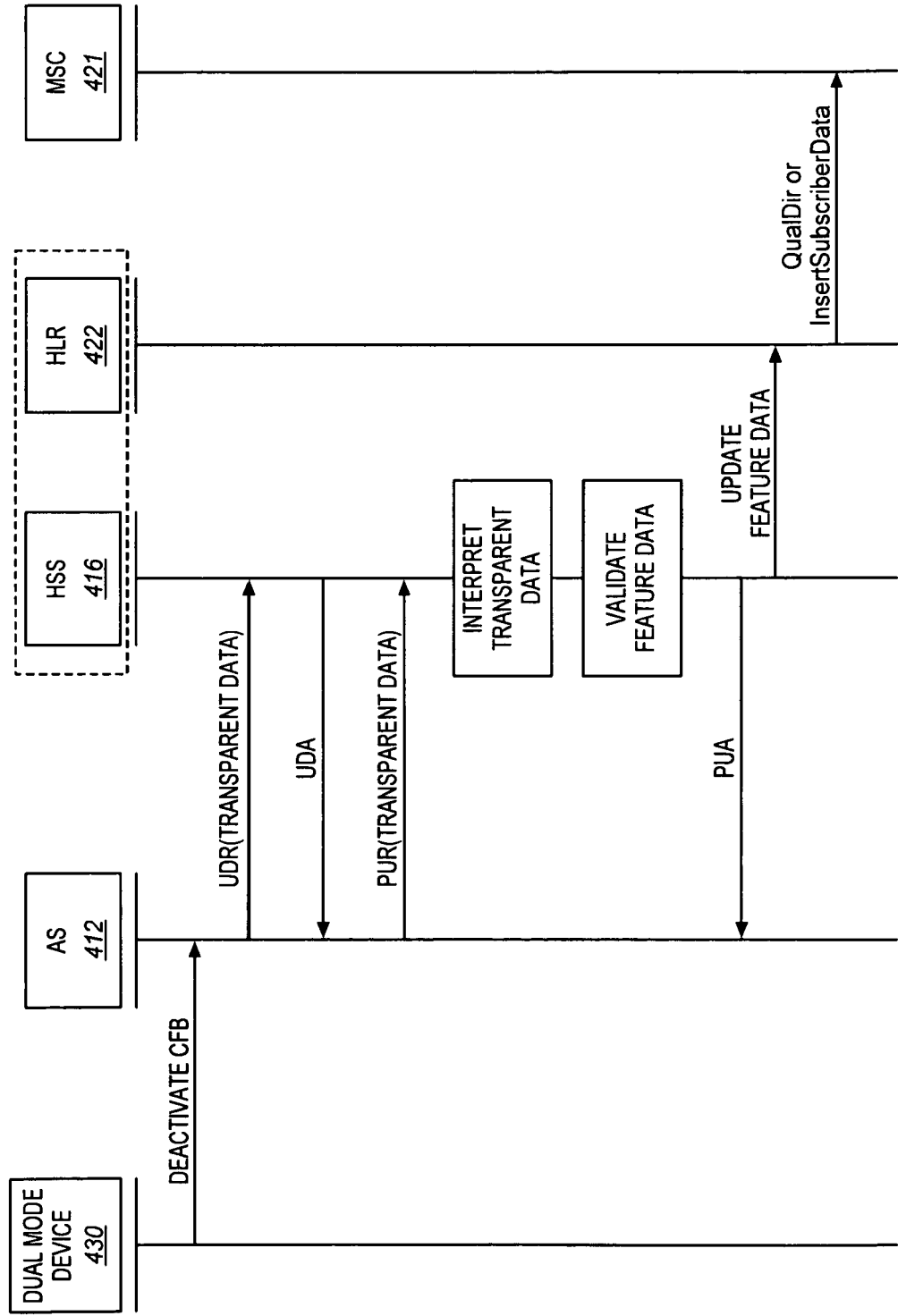
FIG. 6 is a message diagram illustrating synchronizing feature data between an IMS network and a cellular network for a call feature change in the IMS network in an exemplary embodiment of the invention.

Assume at this point that dual mode device 430 has initiated a call or session through IMS network 410. Also assume that the user of dual mode device 430 wants to deactivate the call forwarding busy feature. FIG. 6 is a message diagram illustrating synchronizing feature data between IMS network 410 and cellular network 420 for a call feature change in IMS network 410 in an exemplary embodiment of the invention.

To start in FIG. 6, application server 412 provides the call forwarding busy feature in IMS network 410 (see also FIG. 4). Thus, application server 412 receives an instruction from dual mode device 430 to deactivate the call forwarding busy feature. Responsive to the instruction, application server 412 transmits a UDR to HSS 416 to retrieve feature data if not already cached. HSS 416 responds with a UDA that includes the feature data. Application server 412 then processes the feature data to determine if there has been a change to the feature data based on the instruction. If a change is made, then application server 412 determines that the feature data in HSS 416 and HLR 422 need to be updated.

To update the feature data, application server 412 formats a transparent data block indicating the change to the feature data for the call forwarding busy feature. Application server 112 then transmits a Push Update Request (PUR) to HSS 416 that includes the transparent data block. The HSS 416 will validate that the requested change is acceptable within the rules of the HLR 422 before indicating success or failure. HSS 416 also responds with success or failure to application server 412 with a Push Update Answer (PUA).

HSS 416 interprets the transparent data block in the PUR to identify the change to the feature data for the call forwarding busy feature. Again, this functionality is a departure from the functionality of a traditional HSS of an IMS network, as an HSS does not presently interpret transparent data. HSS 416 then validates the feature data according to rules of updating HLR 422. If such an update is allowed, then HSS 416 updates HLR 422 based on the change to the feature data provided in the transparent data block.

Responsive to the change to the feature data, HLR 422 may update feature data that is being stored in MSC 421. For instance, HLR 422 may transmit a QualDir message or an InsertSubscriberData message to MSC 421 indicating the change to the feature data.

Although not illustrated in FIG. 6, HSS 416 may also notify other application servers 413-414 of the change to the feature data. For instance, if application server 413 subscribed to HSS 416 to be notified of changes to feature data, then HSS 416 will update or format the transparent data block that includes the feature data for one or more of the call features. The transparent data block may be defined for all of the call features, a subset of the call features, or for a single call feature. HSS 416 will then transmit a Push Notification Request (PNR) to application server 413 that includes the transparent data block. Application server 413 may then process the transparent data block to identify the changes to the feature data and update the feature data based on the change.

Figure 7:
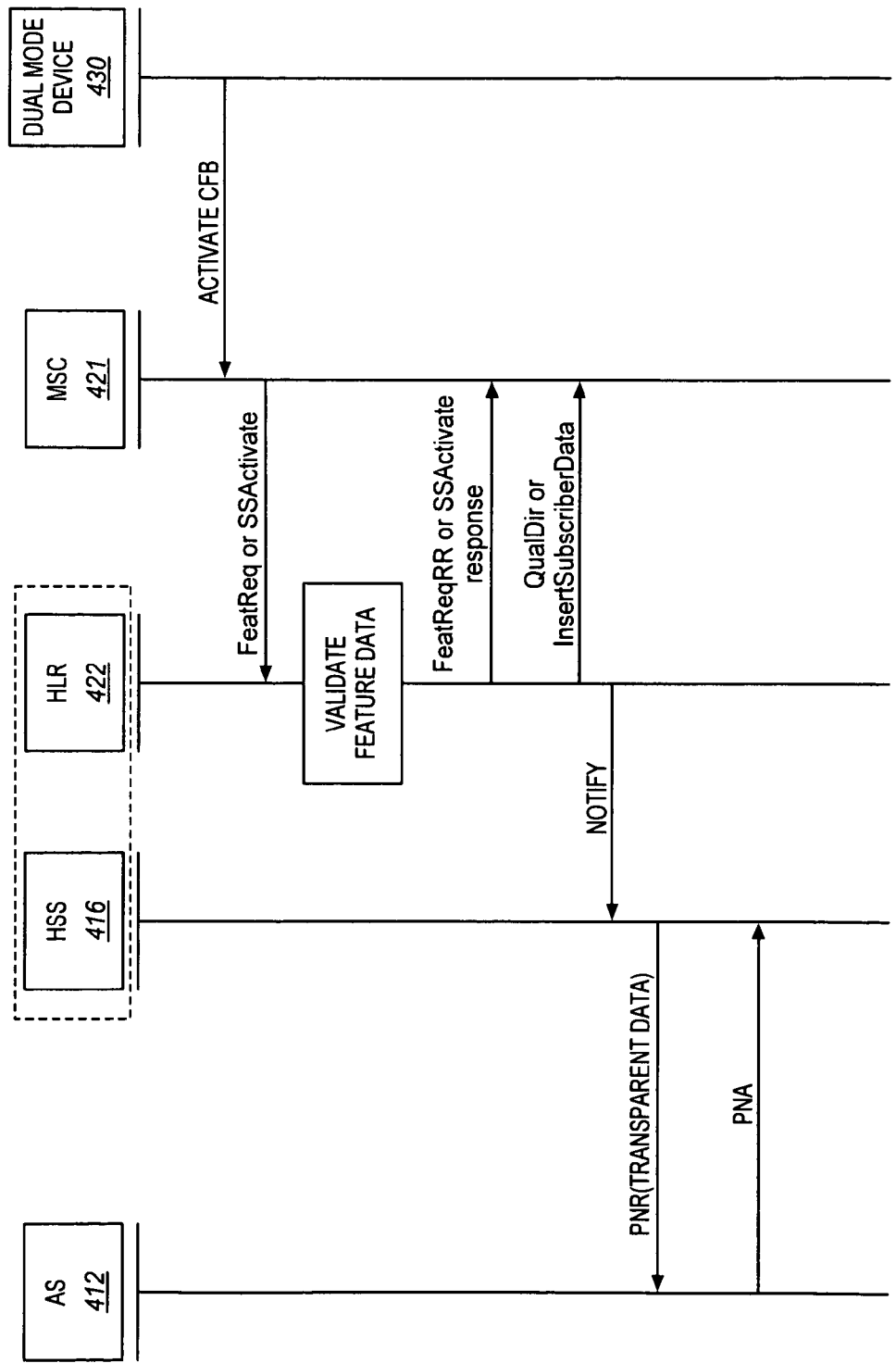
FIG. 7 is a message diagram illustrating synchronizing feature data between an IMS network and a cellular network for a call feature change in the cellular network in an exemplary embodiment of the invention.

FIG. 6 illustrates a change made to a call feature through IMS network 410, but changes may also be made through cellular network 420. Assume now that the user of dual mode device 430 wants to activate the call forwarding busy feature, but this time through cellular network 420. FIG. 7 is a message diagram illustrating synchronizing feature data between IMS network 410 and cellular network 420 for a call feature change in cellular network 420 in an exemplary embodiment of the invention.

To start in FIG. 7, MSC 421 receives an instruction from dual mode device 430 to activate the call forwarding busy feature. Responsive to the instruction, MSC 421 transmits a Feature Request (FeatReq) message or a Supplementary Service Activate (SSActivate) message to HLR 422 indicating the change. HLR 422 responds to MSC 421 with a Feature Request Return Result (featreqRR) message or a Supplementary Service Activate (SSActivate) response message. HLR 422 may also transmit a QualDir message or an InsertSubscriber message to MSC 421 indicating the change to the feature data.

HSS 416 then identifies a change to the feature data for the call forwarding busy feature in HLR 422. HSS 416 may include logic or an application that monitors updates in HLR 422. Alternatively, HLR 422 may include logic or an application that notifies HSS 416 when an update occurs in HLR 422. Responsive to identifying a change to feature data, HSS 416 updates or formats the transparent data block that includes the feature data for one or more of the call features. As previously stated, the transparent data block may be defined for all of the call features, a subset of the call features, or for a single call feature.

HSS 416 then determines which application servers 412-414 subscribed to be notified of a change to the transparent data block. Assume that application server 412 has such a subscription. HSS 416 then transmits a PNR to application server 412 that includes the transparent data block. Application server 412 may then process the transparent data block to identify the changes to the feature data and update the feature data based on the change. Application server 412 also responds to HSS 416 with a PNA.

Using the transparent data functionality of the Sh interface, HSS 416 is advantageously able to identify changes to feature data in IMS network 410 and update HLR 422 based on the feature data change. Also, HSS 416 is able to identify changes to feature data in cellular network 420 and update application servers 412-414 (if necessary) based on the feature data change. The feature data is thus synchronized between IMS network 410 and cellular network 420 which allow networks 410 and 420 to provide consistent call features to dual mode device 430.

Although specific embodiments were described herein, the scope of the invention is not limited to those specific embodiments. The scope of the invention is defined by the following claims and any equivalents thereof.

We claim:

1. A system comprising:
    an IP Multimedia Subsystem (IMS) subscriber server operable to store feature data for an IMS call feature provided to a dual mode device by an IMS network;
    the IMS subscriber server further operable to receive a notification from an application server indicating a change to the feature data in the IMS network made by an end user of the dual mode device, and to update corresponding feature data stored in a legacy subscriber server of a legacy network based on the change to the feature data in the IMS network.

2. The system of claim 1 wherein:
    the IMS subscriber server is further operable to receive a transparent data block defined for a Diameter Sh interface indicating the change to the feature data in the IMS network, to interpret the transparent data block to identify the change to the feature data in the IMS network, to validate the change to the feature data based on rules for the legacy subscriber server, and to update the corresponding feature data stored in the legacy subscriber server based on the change to the feature data in the IMS network provided in the transparent data block.

3. The system of claim 2 wherein the transparent data block indicates a change to feature data for a single IMS call feature.

4. The system of claim 1 wherein:
    the IMS subscriber server is further operable to monitor the legacy subscriber server, to identify a change to feature data in the legacy network, and to notify the application server of the change to the feature data in the legacy network.

5. The system of claim 4 wherein:
    the IMS subscriber server is further operable to receive a subscription request from the application server requesting to be notified of a change to the feature data in the legacy network; and
    responsive to identifying the change to the feature data in the legacy network, the IMS subscriber server is further operable to format a transparent data block defined for a Diameter Sh interface indicating the change to the feature data in the legacy network, and to transmit the transparent data block to the application server.

6. The system of claim 1 wherein the legacy subscriber server and the IMS subscriber server comprise a combined Home Location Register (HLR)/Home Subscriber Server (HSS).

7. The system of claim 1 wherein the legacy network comprises a Universal Mobile Telecommunications System (UMTS) network.

8. A method comprising:
    storing feature data in an IP Multimedia Subsystem (IMS) subscriber server for an IMS call feature provided to a dual mode device by an IMS network;
    receiving a notification from an application server indicating a change to the feature data in the IMS network made by an end user of the dual mode device; and
    updating corresponding feature data stored in a legacy subscriber server of a legacy network based on the change to the feature data in the IMS network.

9. The method of claim 8 wherein:
    the step of receiving the notification from the application server comprises:
        receiving a transparent data block defined for a Diameter Sh interface indicating the change to the feature data in the IMS network, and
        interpreting the transparent data block to identify the change to the feature data in the IMS network; and
    the step of updating the corresponding feature data stored in the legacy subscriber server comprises:
        validating the change to the feature data based on rules for the legacy subscriber server, and
        updating the corresponding feature data stored in the legacy subscriber server based on the change to the feature data in the IMS network provided in the transparent data block.

10. The method of claim 9 wherein the transparent data block indicates a change to feature data for a single IMS call feature.

11. The method of claim 8 further comprising:
monitoring the legacy subscriber server;
identifying a change to feature data in the legacy network; and
notifying the application server of the change to the feature data in the legacy network.

12. The method of claim 11 further comprising:
receiving a subscription request from the application server requesting to be notified of a change to the feature data in the legacy network; and
responsive to identifying the change to the feature data in the legacy network, the method further comprises formatting a transparent data block defined for a Diameter Sh interface indicating the change to the feature data in the legacy network, and transmitting the transparent data block to the application server.

13. The method of claim 8 wherein the legacy subscriber server and the IMS subscriber server comprise a combined Home Location Register (HLR)/Home Subscriber Server (HSS).

14. The method of claim 8 wherein the legacy network comprises a Universal Mobile Telecommunications System (UMTS) network.

15. A system comprising:
an application server of an IP Multimedia Subsystem (IMS) network that is operable to provide an IMS call feature to a dual mode device based on feature data defined for an end user of the dual mode device in the IMS network;
the application server further operable to receive a change to the feature data from the end user of the dual mode device, and to update corresponding feature data of a legacy call feature in a legacy network based on the change to the feature data in the IMS network so that the feature data is synchronized between the IMS network and the legacy network.

16. The system of claim 15 wherein:
the application server is further operable to notify an IMS subscriber server of the change to the feature data in the IMS network to in turn cause the IMS subscriber server to update the corresponding feature data in the legacy network based on the change to the feature data in the IMS network.

17. The system of claim 16 wherein:
the application server is further operable to format a transparent data block defined for a Diameter Sh interface indicating the change to the feature data in the IMS network, and to transmit the transparent data block to the IMS subscriber server.

18. The system of claim 15 wherein:
the application server is further operable to transmit a subscription request to the IMS subscriber server requesting to be notified of a change to feature data in the legacy network, and to receive a notification from the IMS subscriber server indicating a change to feature data in the legacy network.

19. The system of claim 18 wherein:
the application server is further operable to process a transparent data block defined for a Diameter Sh interface to identify the change to the feature data in the legacy network, and to update corresponding feature data in the IMS network.

20. The system of claim 15 wherein the legacy network comprises a Universal Mobile Telecommunications System (UMTS) network.

* * * * *